United States Patent
Engel

(10) Patent No.: US 9,905,042 B2
(45) Date of Patent: Feb. 27, 2018

(54) METHOD AND VISUALIZATION APPARATUS FOR THE VOLUMETRIC VISUALIZATION OF A THREE-DIMENSIONAL OBJECT

(71) Applicant: SIEMENS HEALTHCARE GMBH, Erlangen (DE)

(72) Inventor: Klaus Engel, Nürnberg (DE)

(73) Assignee: SIEMENS HEALTHCARE GMBH (DE)

( * ) Notice: Subject to any disclaimer, the term of this patent is extended or adjusted under 35 U.S.C. 154(b) by 0 days.

(21) Appl. No.: 15/382,769

(22) Filed: Dec. 19, 2016

(65) Prior Publication Data

US 2017/0186216 A1    Jun. 29, 2017

(30) Foreign Application Priority Data

Dec. 29, 2015    (EP) ..................................... 15202887

(51) Int. Cl.
*G06T 15/06*    (2011.01)
*G06T 15/50*    (2011.01)

(52) U.S. Cl.
CPC .............. *G06T 15/06* (2013.01); *G06T 15/50* (2013.01)

(58) Field of Classification Search
None
See application file for complete search history.

(56) References Cited

PUBLICATIONS

Brown Course Note, downloaded @ https://web.archive.org/web/20120131140900/http://cs.brown.edu/courses/cs224/papers/mc_pathtracing.pdf, available online since Jan. 31, 2012.*
"Volume Visualization With Ray Casting"; Pawasauskas; John Pawasauskas; "Volume Visualization With Ray Casting"; http://web.cs.wpi.edu/~matt/courses/cs563/talks/powwie/p1/ray-cast.htm; CS563—Advanced Topics in Computer Graphics; Feb. 18, 1997.
Optische Modelle et al.: "Optische Modelle; Hauptseminar Interaktives Volumenrendering"; pp. 1-23; XP055190803; Gefunden im Internet: URL:https://www.vis.uni-stuttgart.de/uploads/tx_visteaching/Optische_Modelle_-_Daniel_Klier.pdf; 2011.
Kroes T. et al.: "Exposure Render: An Interactive Photo-Realistic Volume Rendering Framework"; PLOS ONE; vol. 7; No. 7; pp. e38586; XP055188757; DOI: 10.1371/journal.pone.0038586;; 2012.

* cited by examiner

*Primary Examiner* — Yingchun He
(74) *Attorney, Agent, or Firm* — Schmeiser Olsen & Watts LLP

(57) ABSTRACT

A three-dimensional object is provided within a light probe, at least one intensive light source of the light probe is detected and selected. Furthermore, a multiplicity of rays are simulated for a respective visualization pixel. For a respective ray entering into an object volume, i) a scattering position is determined, ii) a scattering direction is selected, with a decision being made depending on a first random process as to whether the ray is scattered in the direction of the intensive light source or in a scattering direction to be selected depending on a second random process, and iii) the ray is scattered in the selected scattering direction. Steps i) to iii) are repeated until the ray is absorbed in the object volume or emerges from the object volume and impinges on the light probe.

15 Claims, 1 Drawing Sheet

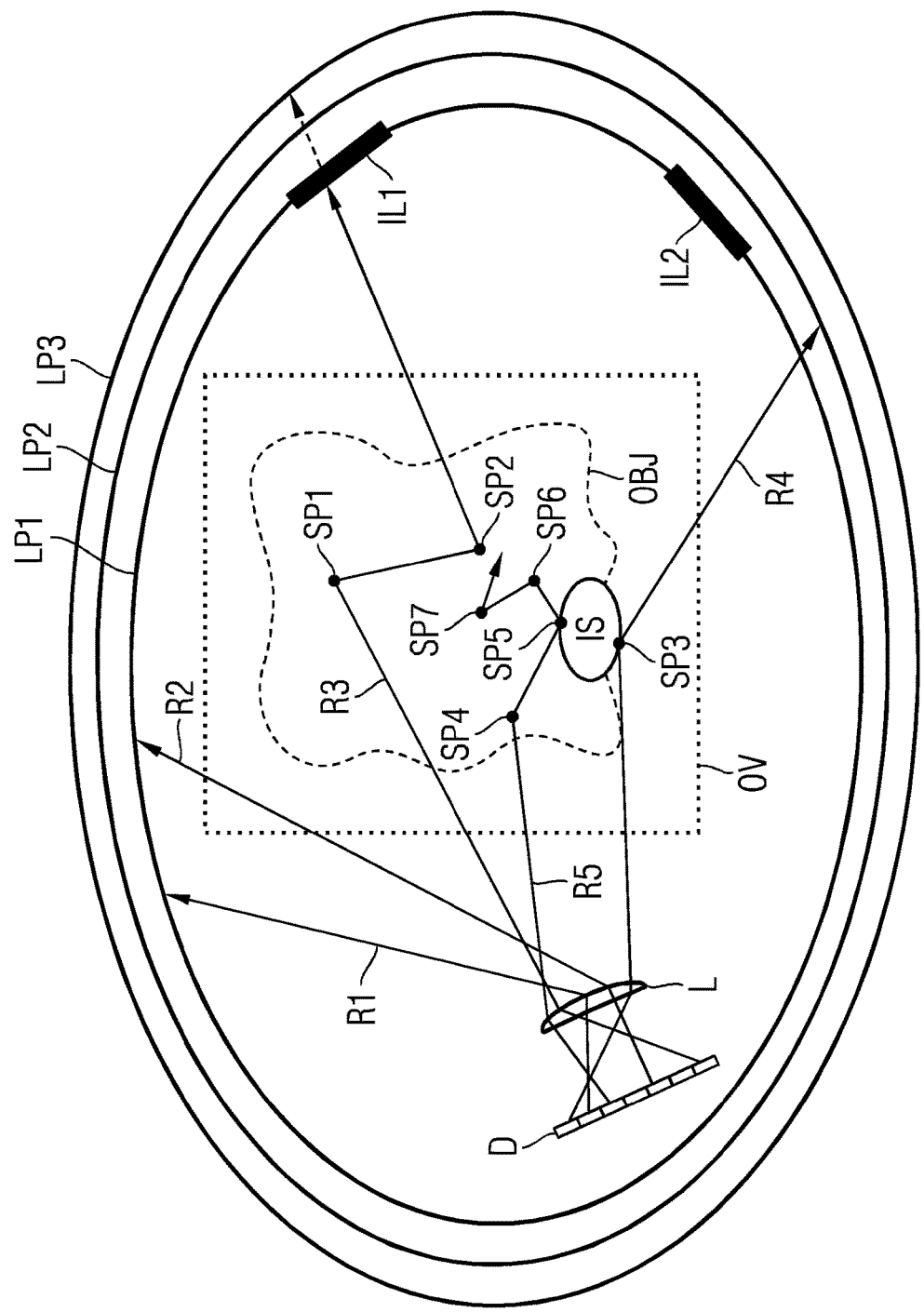

METHOD AND VISUALIZATION APPARATUS FOR THE VOLUMETRIC VISUALIZATION OF A THREE-DIMENSIONAL OBJECT

CROSS-REFERENCE TO RELATED APPLICATIONS

This application claims priority European Application No. 15202887.4 having a filing date of Dec. 29, 2015, the entire contents of which are hereby incorporated by reference.

FIELD OF TECHNOLOGY

The following to the technical field of volume rendering, i.e. visualizing inhomogeneous three-dimensional objects by image synthesis. In particular, such objects may be real bodies or virtually modeled objects. The visualization of three-dimensional objects has a number of fields of application, in particular in medicine, in geophysics, in material testing, in the field of virtual reality and/or computer games.

BACKGROUND

In the case of volume rendering, it is also the interior volume, i.e. not only a surface of an inhomogeneous object, that is visualized, and so it is also possible to reproduce transparency effects and/or internal structures in a realistic manner. Here, the three-dimensional object is represented by volume data in three-dimensional resolution.

A known method for the volume rendering is the so-called ray casting, in which a course of imaginary rays, referred to as rays below, is simulated, said rays emanating from the eye of an imaginary observer or from an imaginary detector and extending through the object to be visualized. Illumination values for points within the object are ascertained along the rays. Finally, a visualized two-dimensional image is assembled from the illumination values ascertained for the rays.

A realistic visualization requires effects of the global illumination, such as e.g. surrounding coverage, cast shadows, translucency, so-called color bleeding, surface shading, complex camera effects and/or illumination by arbitrary surrounding light conditions, to be taken into account as comprehensively as possible. Particularly in the case of volume rendering, such illumination effects substantially contribute to the depth and form perception, and hence to an improved image understanding.

Synthetic light sources are often used for illumination purposes in order to calculate realistic shadow representations. Although such synthetic light sources often offer a good shadow representation, they generally impart a synthetic, unnatural look to the synthesized image, while other illumination methods with naturally looking images are only able to synthesize unsharp shadows.

The article "Exposure Render: An Interactive Photo-Realistic Volume Rendering Framework" by Thomas Kroes et al, PLoS ONE, volume 7, issue 7, July 2012, has disclosed a volume rendering method which uses a Monte Carlo simulation for tracking rays. However, further rays need to be tracked within the object volume in addition to a respective ray in order to calculate realistic shadowing effects, causing a significant computational outlay. Moreover, so-called importance sampling is required, which influences the statistical properties of the Monte Carlo method.

SUMMARY

An aspect relates to a method, a visualization apparatus, a computer program product and a computer-readable storage medium for the volumetric visualization of a three-dimensional object, which permit an efficient inclusion of global illumination effects, in particular with a realistic shadow representation.

For the volumetric visualization of a three-dimensional object within a light probe as an illumination source, the light probe is, according to embodiments of the invention, examined for intensive light sources and at least one intensive light source of the light probe is selected depending on the intensity thereof. Furthermore, a multiplicity of rays are simulated for a respective visualization pixel. Here, visualization pixels may be arranged virtually on an imaging plane or on a curved imaging surface. According to embodiments of the invention, for a respective ray entering into an object volume, i) a scattering position is determined, ii) a scattering direction is selected, with a decision being made depending on a first random process as to whether the ray is scattered in the direction of the at least one selected intensive light source or in a scattering direction to be selected depending on a second random process, and iii) the ray is scattered at the scattering position in the selected scattering direction. Here, the first random process and/or the second random process may be based on e.g. a pseudo- or quasi-random number generator. In particular, the scattering may be virtual scattering. Steps i) to iii) are repeated until the ray is absorbed in the object volume or emerges from the object volume and impinges on the light probe, with an illumination contribution of the ray to the respective visualization pixel being ascertained depending on an intensity value of the light probe. An intensity value for the respective visualization pixel is ascertained by virtue of the illumination contribution of the multiplicity of rays being averaged. The aforementioned intensities or intensity values may, in particular, relate to a brightness and/or color intensity.

A visualization apparatus serves to carry out the method according to embodiments of the invention.

Embodiments of the invention render it possible to take into account complex global illumination effects in an efficient manner. On account of scattering rays in a randomly selected scattering direction up to the absorption thereof or the incidence thereof on the light probe, it is possible to avoid cascading branchings of rays, which are complicated to calculate, and nevertheless take into account complicated light paths within the object volume. To the extent that the light probe wholly or partly surrounds the object volume, it is possible to expect for at least a significant portion of the emerging rays that they are incident on a pixel of the light probe and thus obtain an illumination contribution. What this may avoid is that a large portion of the rays are, as it were, wasted, i.e. tracked without supplying an illumination contribution.

As a result of the randomized combination of scattering in the direction of an intensive light source and scattering in arbitrary directions of the light probe, it is possible to combine advantages of different illumination models. In particular, on the one hand, the use of a light probe permits a visualization which appears very natural and, on the other hand, forcing the scattering in the direction of an intensive light source permits a very realistic shadow representation.

According to one advantageous embodiment of the invention, a visualization parameter relating to a shadow strength may be read and the first random process may be carried out depending on the read visualization parameter. By way of example, a probability with which a respective ray is scattered in the direction of the at least one selected intensive light source may be increased in order to elevate the shadow strength. In this way, the strength of the shadow representation may be changed e.g. interactively by a user in a simple manner.

Furthermore, the first random process may be carried out depending on the intensity of the at least one selected intensive light source. Thus, a probability with which a respective ray is scattered in the direction of the at least one selected intensive light source may be increased with the intensity thereof. Here, it is possible, for example, to take into account the absolute intensity thereof and/or the relative intensity thereof in relation to a mean intensity of the light probe or in relation to an intensity of another light source in the light probe.

If a plurality of selected intensive light sources are present, the selection of the scattering direction may be carried out depending on the respective intensity of the selected intensive light sources. Here, a probability with which a respective ray is scattered in the direction of one of the selected intensive light sources may be increased with the intensity thereof. Here too, an absolute intensity and/or relative intensity may be taken into account in relation to a mean intensity of the light probe or in relation to an intensity of another light source in the light probe.

Advantageously, a list of intensive light sources of the light probe may be created. Here, a direction to this intensive light source, a polygonal chain, assigned to this intensive light source, on the light probe and/or an intensity value may be stored for a respective intensive light source. Such a list permits quick access to parameters relevant to the scattering and to the illumination contribution.

Furthermore, a point of incidence of the emerging ray on the light probe may be ascertained. The illumination contribution of the ray may be ascertained depending on an intensity value at the point of incidence of the light probe.

Further, the illumination contribution of the ray when emerging from the object volume in the direction of the at least one selected intensive light source may be ascertained depending on the intensity thereof. In particular, use may be made here of an intensity value stored in the list. Ascertaining a specific point of incidence of the ray on the light probe may often no longer be required in that case.

According to an advantageous embodiment of the invention, a plurality of light probes surrounding the object volume may be provided as illumination sources. A scattering type may be assigned to the respective ray and one of the light probes may be selected depending on the scattering type of the emerging ray. The illumination contribution of the ray may be ascertained specifically on the basis of the selected light probe. In particular, the scattering type may be reflective, refractive or transmissive. Additionally, an "unscattered" scattering type may also be provided for non-scattered rays. Preferably, a reflective and/or refractive scattering type may be assigned to strongly anisotropic scattering corresponding to at most slightly diffuse mirroring or refraction at a surface, while a transmissive scattering type may be assigned to scattering with comparatively little anisotropy. Preferably, an at most slightly unsharp light probe may be selected in the case of a reflective or refractive scattering type and a comparatively strongly blurred light probe may be selected in the case of a transmissive scattering type.

In particular, at least one second one of the light probes may be generated from a first one of the light probes by filtering which is specific to a scattering type. Thus, a first, unfiltered light probe may be generated for non-scattered rays, a second light probe which was slightly blurred by means of an unsharpness filter may be generated for a reflective or refractive scattering type and a light probe which is strongly blurred or diffuse in relation thereto may be generated for a transmissive scattering type. In this way, specific properties of instances of scattering, such as, in particular, the anisotropy thereof, may be reproduced or implemented effectively by appropriately filtered light probes.

Furthermore, the object may be represented by volume data which specify a density of the object in the object volume. The scattering position may then be determined depending on the density along the respective ray and the illumination contribution of the respective ray may be influenced by the density at the scattering position. Here, in particular, the density may be a physical density, an optical density, a refractive index and/or a brightness value, color value, transparency value and/or opacity value and may be provided in scalar, vector or tensor form.

Preferably, a transfer function may be provided, which maps a respective value of the density to a brightness value, color value, transparency value and/or opacity value. Inner structures of the object, which are characterized by different densities or a characteristic density profile, may be visualized in this way in a predeterminable manner by colors, brightness, transparency and/or opacity. In particular, a color value of the illumination contribution of the ray, present prior to the scattering, may be linked to a color value assigned to the density, e.g. multiplied thereby, and the resultant color value may be inserted into the illumination contribution of the ray.

In accordance with a further embodiment, a number of carried out instances of scattering of the ray may be ascertained, e.g. counted, and the absorption of the ray in the object volume may be carried out dependent on this number. In particular, a maximum number may be predetermined for the instances of scattering, with the ray counting as absorbed once said number is exceeded.

An exemplary embodiment of the invention is explained in more detail below on the basis of the drawing.

BRIEF DESCRIPTION

Some of the embodiments will be described in detail, with reference to the following FIGURES, wherein like designations denote like members, wherein:

FIG. 1 schematically shows a visualization of an inhomogeneous three-dimensional object within an illumination source.

DETAILED DESCRIPTION

FIG. 1 elucidates a visualization of an inhomogeneous three-dimensional object OBJ. By way of example, this may be a body part modeled virtually on the basis of tomography data or a synthetic object from virtual reality. The visualization is carried out by image synthesis. The structures elucidated in the FIGURE are preferably simulated as virtual structures by way of a computer. An essential part of the calculations required here to this end may preferably be swapped to a graphics card and carried out there in a massively parallel manner.

The object OBJ is contained in a three-dimensional object volume OV, which is indicated by a dotted rectangle in the FIGURE. The object OBJ is represented by volume data within the object volume OV, said volume data specifying a density of the object OBJ to be visualized in a three-dimensional or spatial resolution. Here, the density may, in particular, specify a physical density, an optical density, a refractive index and/or a brightness, color, transparency, intensity and/or opacity of the object OBJ in three-dimensional resolution.

A virtual detector D serves as an imaging plane onto which the visualized object OBJ is projected virtually. The detector D comprises a multiplicity of virtual visualization pixels arranged in a planar manner. A virtual lens L which, together with the detector D, forms a virtual camera is arranged in front of the detector D. By arranging detector D and lens L, it is possible to simulate optical imaging effects such as depth and/or motion unsharpness.

As an exemplary inner structure, the object OBJ has an implicit surface IS. Inner or outer regions of the object OBJ in which a density profile, as it were, has a jump, i.e. in which the magnitude of the gradient of the density becomes very large on a local scale, may be considered to be, or identified as, implicit surfaces. By way of example, this is the case in the transition from muscle tissue to bone tissue. The corresponding transition may then be identified as a bone surface. A surface identified in this manner, in this case IS, may preferably be assigned with reflecting properties.

A plurality of light probes LP1, LP2 and LP3 surrounding the object volume OV are provided as virtual illumination sources. By means of such light probes, the object may be visualized as if it was situated in the surroundings imaged by the light probe and exposed to the illumination induced hereby in a realistic manner. Such light probes are often also referred to as "light maps" and may, in particular, contain light sources with different intensities. Here, and below, an intensity may, in particular, relate to a brightness or a color intensity. Preferably, the light probes LP1, LP2 and LP3 surround the object volume OV as completely as possible such that, where possible, each ray emerging from the object volume OV is incident on one of the light probes LP1, LP2 or LP3. The light probes LP1, LP2 or LP3 are in each case arranged or projected in such a way that they image the view which an observer situated in the object volume OV would have of the imaged surroundings.

For the present exemplary embodiment, the assumption is made that the light probe LP1 is an unfiltered light probe, e.g. a panoramic image of a street. The light probe LP2 is a reflective light probe which was generated from the light probe LP1 by the application of a slight unsharpness filter. The light probe LP2 is therefore a slightly blurred version of the light probe LP1. Finally, the light probe LP3 is a diffuse light probe which was generated from the light probe LP1 by the application of a strong unsharpness filter. The light probe LP3 is therefore a strongly blurred or almost diffuse version of the light probe LP1. Such a virtually diffuse light probe LP3 is often also referred to as "irradiance light map".

Embodiments of the invention render it possible to influence a shadow representation when visualizing the object OBJ in a simple and flexible manner. To this end, a visualization parameter which relates to a strength or manifestation of the shadow representation is read and/or queried from a user via a user interface before the calculation of the visualization. By way of example, this may be a numerical value between 0 and 1 or between 0% and 100%.

According to embodiments of the invention, intensive light sources are searched for in the unfiltered light probe LP1. In the present exemplary embodiment, two intensive light sources IL1 and IL2 are detected in the light probe LP1 in the process and the intensity thereof is ascertained. By way of example, exceeding a predetermined threshold for an absolute intensity of a light source and/or for relative intensity in relation to e.g. a mean intensity of the light probe LP1 may serve as a detection criterion here. Alternatively, or additionally, it is possible to create a list of the most intensive light sources in the light probe LP1 and/or light sources in the light probe LP1 are sorted according to the intensity thereof and a predetermined number of the most intensive of these light sources may be selected. Preferably, the respective intensity value and a direction to this light source from the view of the object volume and/or a polygon chain on the light probe assigned to this light source are stored for each one of these light sources in the list of the most intensive light sources of the light probe. The ascertained intensive light sources IL1 and IL2 are elucidated in the FIGURE by thickened bars.

In order to generate an image of the object OBJ to be visualized, which should be presented to a user, a multiplicity of rays are simulated, i.e. calculated, for a respective visualization pixel of the detector D, said rays emanating from the respective visualization pixel. For the present exemplary embodiment, exemplary rays R1, . . . , R5 are indicated in the FIGURE. A ray R1, . . . , R5 emanating from a respective visualization pixel of the detector D is preferably directed to a randomly selected position on the virtual lens L and refracted at the selected position in accordance with a refractive power of the lens L according to the physical refraction law. The refracted ray R1, . . . , R5 then continues to be tracked.

Each ray emanating from a visualization pixel is assigned an illumination contribution which preferably contains a color value. At the outset, the color value is initialized with the color white. What is ascertained for the rays refracted by the lens L in each case is whether or not they penetrate into the object volume OV. In the present exemplary embodiment, the ray R1 does not penetrate into the object volume OV, while the other rays R2, . . . , R5 penetrate into the object volume OV. For the rays R2, . . . , R5 penetrating into the object volume OV, a respective scattering position SP1, . . . or SP7 within the object volume OV is ascertained by means of the so-called Woodcock tracking. In the case of Woodcock tracking, a scattering probability increases with the length of the path covered in the object volume OV depending on the density of the object OBJ along the respective ray. Scattering of the respective ray is simulated at the ascertained scattering position. The scattering changes the direction of the ray, which is indicated in the FIGURE by bends, characterized by points, at the respective scattering position SP1, . . . or SP7. In particular, a respective ray R2, . . . , R5 is scattered without branching. In this way, it is possible to avoid cascading branchings of rays or branched trees of rays, which require much outlay to calculate.

The scattering direction in which a respective ray is scattered at a respective scattering position is selected by means of two random processes in the present exemplary embodiment. Here, in particular, the random processes may be realized by pseudo- or quasi-random number generators. When selecting the scattering direction, a decision is initially made on the basis of a first random process as to whether the relevant ray is scattered in the direction of the selected intensive light sources IL1 and IL2, i.e. whether the scattering direction is restricted to directions toward the intensive light sources IL1 or IL2, or whether there is no such restriction. Here, the first random process is carried out depending on the read visualization parameter. Here, the visualization parameter may predetermine the probability with which the scattering direction is restricted to directions toward the intensive light sources IL1 and IL2. Thus, a random number between 0 and 1 may be generated by the first random process and compared to the visualization parameter. If the random number is less than the visualization parameter, the scattering direction is restricted to directions toward the intensive light sources IL1 and IL2, while there is no such restriction in the other case.

If the scattering direction is restricted to directions toward the intensive light sources IL1 and IL2, it is possible to select one of the intensive light sources and a random position on this intensive light source by way of a further random process. Then, scattering takes place in the direction of this random position. Alternatively, or additionally, the restriction of the scattering direction to the intensive light sources IL1 and IL2 may also be carried out depending on the relative intensity thereof in relation to one another or in relation to a mean intensity of the light probe LP1. Thus, scattering in the direction of this particularly intensive light source may be forced in the case of the detection of such a particularly intensive light source.

If the scattering of the respective ray is not restricted to directions toward the intensive light sources IL1 and IL2, the scattering direction is selected by means of a second random process. Here, scattering in any direction may be permitted. Here, the scattering directions may be distributed in a statistically uniform manner or ascertained depending on a probability density function. Such a probability density function is often also referred to as a phase function or a PDF. For a given scattering position, it specifies the probability with which the respective ray is scattered in the respective scattering direction. The phase function may be derived from local material properties of the object OBJ, for example on the basis of a local x-ray attenuation or absorption, derived from the tomography data, in accordance with the so-called Hounsfield scale. The local material properties are preferably encoded as a component of the density in the volume data of the object OBJ. Preferably, the volume data are encoded in such a way that the density, and the data derived therefrom, may be interpolated efficiently at each position of the object volume OV and, in particular, along the rays and the scattering positions thereof. In the present exemplary embodiment, the scattering direction is selected dependent on the second random process and dependent on the phase function for the case of scattering not restricted to the intensive light sources IL1 and IL2. The respective ray is then scattered into the selected scattering direction at the scattering position.

A local color or intensity at the scattering position may be derived by applying a transfer function to the preferably interpolated density or the components thereof. By way of example, the transfer function may assign a darker, more saturated and/or different color to higher densities than lower densities. The color present at the scattering position is combined, e.g. multiplied, with the color assigned to the respective ray in order to model an interaction between light and the object OBJ at the scattering position.

The ray R3, . . . , R5 scattered in the selected scattering direction is tracked by means of Woodcock tracking in order to determine the next scattering position, where the same method steps are carried out as in the preceding scattering position. This process is repeated until the respective ray is absorbed in the object volume OV or leaves the object volume OV and is incident on one of the light probes LP1, LP2 or LP3. Here, the absorption may be modeled by virtue of a maximum number of scattering events being predetermined, with the respective ray counting as absorbed if said number is exceeded, or by virtue of use being made of a probability density function for the absorption of a respective ray on the basis of the number of scattering events. Such a combination of Woodcock tracking with random scattering is often also referred to as Monte Carlo rendering.

If an array is incident on a light probe LP1, LP2 and/or LP3, an illumination contribution of this ray to the respective visualization pixel is ascertained depending on an intensity value of this light probe at the point of incidence of the ray on this light probe. Which one of the light probes LP1, LP2 and LP3 is used for ascertaining the illumination contribution of the respective ray is ascertained on the basis of the scattering type of this ray.

In the present exemplary embodiment, the illumination contribution of a non-scattered ray is ascertained by means of the non-filtered light probe LP1. Accordingly, the illumination contribution of an only reflected ray is ascertained on the basis of the reflective light probe LP2 and the illumination contribution of a transmissively scattered ray is ascertained on the basis of the diffuse light probe LP3. If a ray leaves the object volume OV in the direction of one of the intensive light sources IL1 or IL2, the illumination contribution of this ray may, alternatively or additionally, also be ascertained depending on the intensity of this intensive light source stored in the list of intensive light sources.

Statistical averaging is carried out in a visualization pixel by visualization pixel manner over the multiplicity of tracked rays. When further rays are calculated over the course of the visualization, the quality of the generated image improves successively, i.e. statistically caused image noise reduces over the course of the simulation.

In the present exemplary embodiment, the ray R1 leaving the lens L does not impinge on the object volume OV but impinges on the non-filtered light probe LP1 as a non-scattered ray. The same also applies to the ray R2, which does penetrate through the object volume OV but is not scattered there and therefore likewise obtains the illumination contribution thereof dependent upon the intensity of the light probe LP1 at the point of incidence.

Initially, the ray R3 is scattered transmissively in the object volume OV at the scattering position SP1. Here, a decision is initially made on the basis of the first random process that the scattering direction is not restricted to the intensive light sources IL1 and IL2 but that a selection is made from all surrounding directions by means of the second random process. Subsequently, the ray R3 is transmissively scattered again at the scattering position SP2, with a decision being made on the basis of the first random process that the scattering direction selection is restricted to the intensive light sources IL1 and IL2. After the restriction to the intensive light sources IL1 and IL2, firstly, the first intensive light source IL1 and, furthermore, a random point of incidence of the ray R3 on the intensive light source IL1 are selected depending on a further random process. Here, the selection may advantageously be carried out depending on the stored intensity of the intensive light sources IL1 and IL2. To the extent that the ray R3 leaves the object volume OV in the direction of the intensive light sources IL1 after the second scattering, the intensity of the intensive light source IL1 at the point of incidence of the ray R3 on the light probe LP1 may be assigned to this ray R3 as illumination contribution. A transmissive scattering type is assigned to the ray R3 on account of the transmissive scattering instances at the scattering positions SP1 and SP2. On account of the transmissive scattering type, it is also possible to select the diffuse light probe LP3 as an alternative, or in addition, to the illumination contribution of the intensive light source IL1 for the purposes of ascertaining the illumination contribution of the ray R3 depending on the intensity value of the light probe LP3 at the point of incidence of the ray R3. Such a selection of the diffuse light probe LP3 is indicated in the FIGURE by a dashed continuation of the ray R3.

The ray R4 is only scattered once within the object volume OV, specifically in a reflective manner at the implicit surface IS, before it leaves the object volume OV. On account of the reflective scattering, the ray R4 is assigned a reflective scattering type and the illumination contribution thereof is ascertained on the basis of the reflective light probe LP2, i.e. on the basis of an intensity value of the light probe LP2 at the point of incidence of the ray R4.

For the rays incident on the light probes or the intensive light sources IL1 and IL2, in this case R1, . . . , R4, a respective illumination contribution is combined, e.g. multiplied, with the color assigned to the respective ray and added to the respectively assigned visualization pixel.

The ray R5 is scattered in the interior of the object OBJ at scattering positions SP4, . . . , SP7 and thereafter absorbed within the object OBJ, e.g. on account of a high local density in the vicinity of the last scattering position SP7. To the extent that the ray R5 remains within the object volume OV after all scattering events, this ray R5 obtains no illumination contribution.

The ray R5 is initially transmissively scattered at the scattering position SP4, where a decision is made on the basis of the first random process that the scattering direction is restricted to the intensive light sources IL1 and IL2. Subsequently, a direction pointing to the intensive light source IL2 is selected in a manner dependent on a further random process. When the tracking of the ray R5 in this selected scattering direction is continued, the ray R5 is incident on the implicit surface IS and reflectively scattered there at the scattering position SP5. In the case of this reflective scattering, scattering directions along a reflection direction in accordance with the physical reflection law are greatly preferred in relation to other scattering directions. The reflectively scattered ray R5 is therefore, to a certain extent, focused in a probabilistic manner in the reflection direction predetermined by the reflection law. When the tracking of the ray R5 scattered thus is continued, the further scattering position SP6 is ascertained, where a decision is made on the basis of the first random process that the available scattering directions are not to be restricted to the intensive light sources IL1 and IL2. As a consequence, a scattering direction is selected from all surrounding directions in a manner dependent on a further random process and the ray R5 is scattered in this direction. Following this, the further scattering position SP7 is ascertained and a decision is made on the basis of the first random process that the scattering is restricted in the direction of the intensive light sources IL1 and IL2. After the scattering in this direction, the ray R5 is absorbed in the object OBJ, as already mentioned above.

On account of the ray R5 being scattered in the direction of the intensive light source IL2 at the scattering position SP4, said intensive light source, as it were, lying behind the implicit surface IS from the point of view of the ray R5, the ray R5 is incident on this implicit surface IS and reflected by the latter, which ultimately leads to the absorption of this ray. From this it is clear that, to a certain extent, all scattering positions situated behind the implicit surface IS from the view of the intensive light source IL1—at least in the case of the scattering decision in the direction of this intensive light source IL2—are shadowed by the implicit surface IS. In this manner, a realistic representation of the shadows which are cast by the intensive light sources IL1 or IL2 at obstacles in the object OBJ may be achieved.

The visualization pixels of the detector D form a visualization image buffer which contains the statistical, e.g. arithmetically averaged, illumination contribution of all rays. This visualization image buffer is continuously presented to the user and continuously refined by the calculation of further rays in the background. If visualization parameters, such as e.g. the set shadow strength or position of the virtual camera, change, the visualization image buffer may be deleted and the calculation or simulation of rays may be started afresh. Since the rays and the illumination contributions may be calculated independently of one another, the visualization method according to embodiments of the invention may be easily parallelized and hence it may be carried out effectively on a multi-core architecture or on a graphics card operating massively in parallel.

By using a Monte Carlo method for ray or color tracking, embodiments of the invention may take into account any light paths through the object volume OV and may reproduce complicated illumination effects and camera models. In particular, combining the illumination methods controlled in a manner dependent on the first random process, i.e. the scattering in the direction of the selected intensive light sources or the scattering in any directions of the light probe, allows the advantages of both illumination methods to be combined. Here, the use of light probes firstly leads to a very naturally appearing visualization and the forcing of the scattering in the direction of intensive light sources secondly leads to a very realistic shadow representation. Moreover, the strength of the shadow representation may easily be varied by a user.

Although the present invention has been described in detail with reference to the preferred embodiment, it is to be understood that the present invention is not limited by the disclosed examples, and that numerous additional modifications and variations could be made thereto by a person skilled in the art without departing from the scope of the invention.

It should be noted that the use of "a" or "an" throughout this application does not exclude a plurality, and "comprising" does not exclude other steps or elements. Also elements described in association with different embodiments may be combined. It should also be noted that reference signs in the claims should not be construed as limiting the scope of the claims.

The claims are as follows:

1. A method for a volumetric visualization of a three-dimensional object within a light probe as an illumination source, wherein:
   a) the light probe is examined for intensive light sources and at least one intensive light source of the light probe is selected depending on an intensity thereof;
   b) a multiplicity of rays simulated for a respective visualization pixel, wherein, for a respective ray entering into an object volume:
      i) a scattering position is determined,
      ii) a scattering direction is selected, with a decision being made depending on a first random process as to whether the respective ray is scattered in a direction of the at least one selected intensive light source or in a scattering direction to be selected depending on a second random process,
      iii) the respective ray is scattered at the scattering position in the selected scattering direction, and
      iv) steps i) to iii) are repeated until the respective ray is absorbed in the object volume or emerges from the object volume and impinges on the light probe, with an illumination contribution of the respective ray to the respective visualization pixel being ascertained depending on an intensity value of the light probe; and c) an intensity value for the respective visualization pixel is ascertained by virtue of the illumination contribution of the multiplicity of rays being averaged.

2. The method as claimed in claim 1, wherein a visualization parameter relating to a shadow strength is read and in that the first random process is carried out depending on the read visualization parameter.

3. The method as claimed in claim 1, wherein the first random process is carried out depending on the intensity of the at least one selected intensive light source.

4. The method as claimed in claim 1, wherein, in the case of a plurality of selected intensive light sources, the selection of the scattering direction is carried out depending on the respective intensity of the selected intensive light sources.

5. The method as claimed in claim 1, wherein a list of intensive light sources of the light probe is created, wherein a direction to the at least one selected intensive light source, a polygonal chain, assigned to the intensive light source, on the light probe and/or an intensity value is stored for the at least one selected intensive light source.

6. The method as claimed in claim 1, wherein a point of incidence of the respective ray emerging from the object volume on the light probe is ascertained, and in that the illumination contribution of the ray is ascertained depending on an intensity value at the point of incidence of the light probe.

7. The method as claimed in claim 1, wherein the illumination contribution of the ray when emerging from the object volume in the direction of the at least one selected intensive light source is ascertained depending on the intensity thereof.

8. The method as claimed in claim 1, wherein a plurality of light probes surrounding the object volume are provided as illumination sources, in that a scattering type is assigned to the respective ray, in that one of the light probes is selected depending on the scattering type of the emerging ray, and in that the illumination contribution of the ray is ascertained specifically on the basis of the selected light probe.

9. The method as claimed in claim 8, wherein at least one second one of the light probes is generated from a first one of the light probes by filtering which is specific to a scattering type.

10. The method as claimed in claim 1, wherein the object is represented by volume data which specify a density of the object in the object volume, in that the scattering position is determined depending on the density along the respective ray, and in that the illumination contribution of the respective ray is influenced by the density of the scattering position.

11. The method as claimed in claim 10, wherein a transfer function is provided, which maps a respective value of the density to a brightness value, color value, transparency value, intensity value and/or opacity value.

12. The method as claimed in claim 1, wherein a number of carried out instances of scattering of the ray is ascertained, and
in that the absorption of the ray in the object volume is carried out depending on this number.

13. A visualization apparatus for the volumetric visualization of a three-dimensional object, the apparatus comprising a computer readable storage medium and a computing processor, configured to carry out a method as claimed in claim 1.

14. A non-transitory computer readable media having stored thereon a computer program product that is executed by a computer for the volumetric visualization of a three-dimensional object, configured to carry out a method as claimed in claim 1.

15. A non-transitory computer-readable storage medium comprising a computer program product as claimed in claim 14.

* * * * *